United States Patent
Gobled et al.

(10) Patent No.: US 6,257,794 B1
(45) Date of Patent: Jul. 10, 2001

(54) SLIDING MOUNT FOR SECURING A PLASTICS MOTOR VEHICLE BODY PART PIECE ON A SUPPORT

(75) Inventors: Patrice Gobled, Nurieux; Claude Jacquemard; Sébastien Courtois, both of Oyonnax; Marc Rossetto, Rogna, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/280,748

(22) Filed: Mar. 29, 1999

(30) Foreign Application Priority Data

Mar. 31, 1998 (FR) .................................................... 98 03964

(51) Int. Cl.⁷ ....................................................... F16B 2/00
(52) U.S. Cl. ............................. 403/28; 403/329; 403/353
(58) Field of Search ..................................... 403/353, 375, 403/326, 329, 319, 331, 24, 28–30; 243/503

(56) References Cited

U.S. PATENT DOCUMENTS

| 3,456,706 | 7/1969 | Ollis . |
| 4,436,269 | * 3/1984 | Dirksing et al. .................. 403/329 X |
| 4,597,153 | 7/1986 | Zaydel . |
| 5,489,162 | * 2/1996 | LoCicero et al. ................. 403/353 X |
| 5,701,824 | * 12/1997 | Johnson et al. ................... 403/331 X |

FOREIGN PATENT DOCUMENTS

| 2273967 | * 1/1976 | (FR) ...................................... 403/353 |
| 2747091 | 10/1997 | (FR) . |
| 2224231 | * 5/1990 | (GB) ...................................... 403/331 |
| 2281260 | 3/1995 | (GB) . |

* cited by examiner

Primary Examiner—Harry C. Kim
(74) Attorney, Agent, or Firm—Schweitzer Cornman Gross & Bondell LLP

(57) ABSTRACT

A sliding mount for a part made of plastics material and having at least one thin wall that is to be mounted in sliding manner on a support via its thin wall, the thin wall having an elongate opening therein with two longitudinal edges that are substantially parallel at least over a portion of their length, the mount comprising a spacer that is separate from the part, that is thicker than the thin wall, and that is suitable for sliding in the opening between the two longitudinal edges thereof. The spacer comprises an elastically deformable portion bearing slidably against the thin wall of the part when the spacer slides in the opening, the thin wall having a coupling shape organized in such a manner that when the spacer is in a privileged position relative to the opening, the deformable portion of the spacer couples with the thin wall.

10 Claims, 2 Drawing Sheets

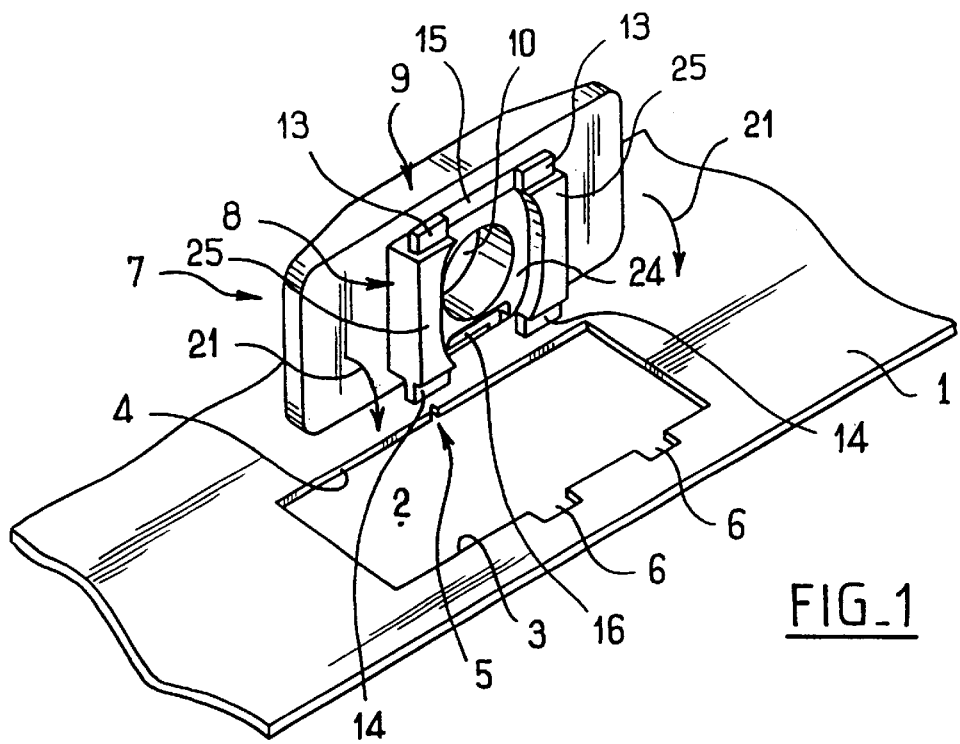
FIG_1
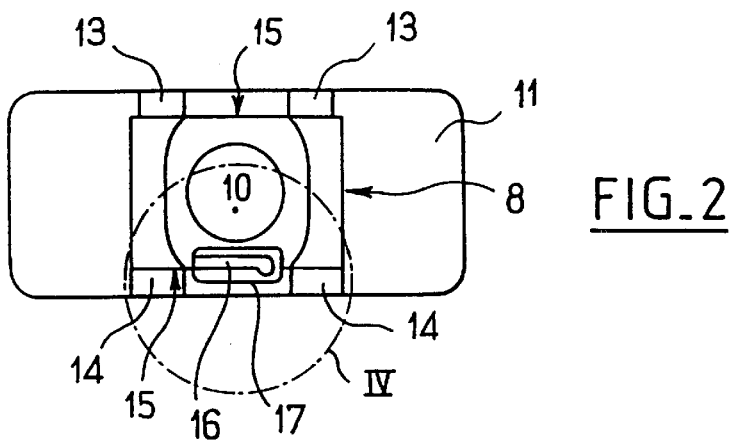
FIG_2
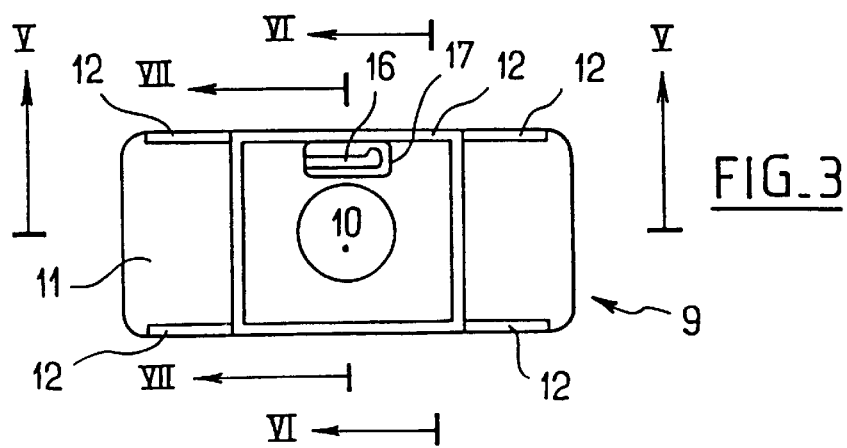
FIG_3

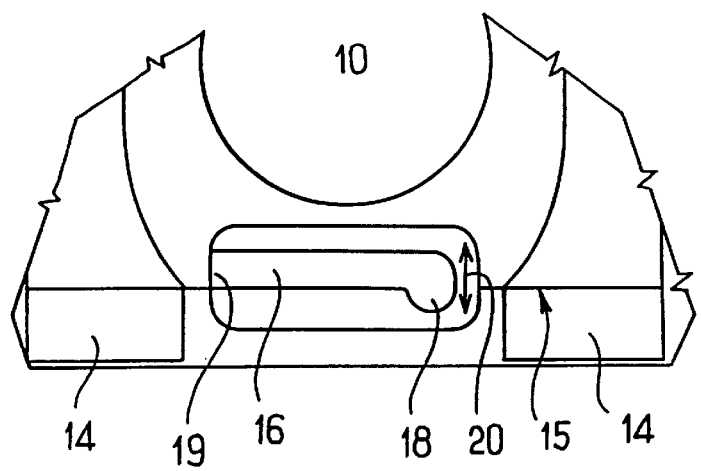
FIG_4
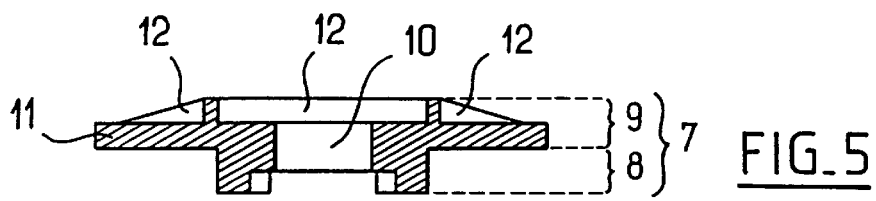
FIG_5
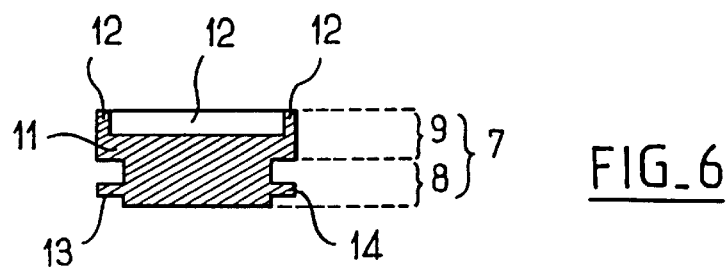
FIG_6
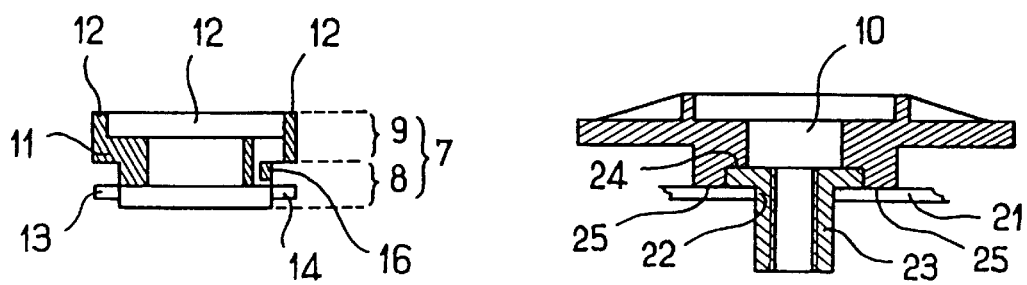
FIG_7
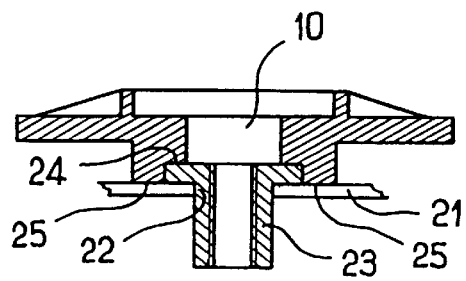
FIG_8

SLIDING MOUNT FOR SECURING A PLASTICS MOTOR VEHICLE BODY PART PIECE ON A SUPPORT

The present invention relates to a plastics material piece suitable for being mounted in sliding manner on a support.

BACKGROUND OF THE INVENTION

Motor vehicle bodywork parts are secured to the structure of the vehicle by add-on mounts which hold them in position throughout all stages of manufacture of the vehicle subsequent to them being put into place, and also throughout the lifetime of the vehicle.

The steps in vehicle manufacture subsequent to bodywork parts being put into place include the step of electrophoresis which consists in immersing the entire vehicle, including its bodywork parts, in a bath, and then passing the vehicle through an oven at a temperature lying in the range about 180° C. to 220° C. so as to treat the structure of the vehicle and all of the metal parts it includes against corrosion, and also a painting step which comprises a stage of baking at a temperature lying in the range about 140° C. to 170° C.

Those various operations are designed for bodywork parts made of sheet metal.

However, bodywork parts made of plastics material withstand such treatment less well, particularly the baking treatment for paintwork.

During heating, the plastics material parts expand to a much greater extent than do the structural parts of the vehicle, and as a result a large amount of differential expansion arises between the structure of the vehicle and the bodywork parts that are mounted thereon. As a result the bodywork parts made of plastics material deform and warp or form corrugations that spoil the appearance of the vehicle.

In addition, differential expansion can occur during the lifetime of the vehicle, given that its parts can reach temperatures of close to 80° C., and that also needs to be taken into account in the way bodywork parts are mounted to the structure of a vehicle.

Finally, another problem arises because of the shrinkage to which thermoplastics material parts are subject after a rise in temperature and over time, which phenomenon is known as "post-shrinkage", giving rise to bodywork parts moving relative to the structure of the vehicle, independently of phenomena of differential expansion.

To solve those drawbacks, add-on mounts are used that enable a bodywork part to slide relative to the structure of the vehicle. Such mounts are referred to as "sliding mounts".

French patent application No. 96 04317, published under the number 2 747 091, describes such a sliding mount, which is provided with spring blades for returning it towards a privileged position.

That sliding mount gives rise to various problems which are associated with the presence of said spring blades.

The privileged position of the sliding mount corresponds to an equilibrium position in which the spring blades exert opposite forces of the same amplitude on the mount. Consequently, this position depends on the stiffnesses of the two blades and can vary from one mount to another if the stiffnesses of the blades are not stable in production.

Furthermore, the plastics material used for making the sliding mount is preferably creep-resistant, thereby making it rather brittle and not very flexible, whereas the spring blades need on the contrary to be elastically deformable.

As a result, in order to make the sliding mount, it is necessary to select an intermediate plastics material that provides a compromise between those two contrary requirements, or else the spring blades must be made of an elastic material that is different from the remainder of the sliding mount.

OBJECTS AND SUMMARY OF THE INVENTION

The present invention seeks to provide a novel sliding mount which presents the advantages of being easy to put into place on a bodywork part, and of prepositioning itself relative to said part so as to facilitate the engagement of members for mounting the bodywork part in their housings, without representing the above-mentioned drawbacks.

The present invention provides a sliding mount for a part made of plastics material and having at least one thin wall that is to be mounted in sliding manner on a support via its thin wall, the thin wall having an elongate opening therein with two longitudinal edges that are substantially parallel at least over a portion of their length, the mount comprising a spacer that is separate from the part, that is thicker than the thin wall, and that is suitable for sliding in the opening between the two longitudinal edges thereof, wherein the spacer comprises an elastically deformable portion bearing slidably against the thin wall of the part when the spacer slides in the opening, the thin wall having a coupling shape organized in such a manner that when the spacer is in a privileged position relative to the opening, the deformable portion of the spacer couples with the thin wall.

In other words, while the spacer is sliding in the opening, the elastically-deformable portion snaps into the coupling shape of the thin wall, thus defining a hard point in the stroke of the spacer corresponding to the privileged position of the spacer relative to the opening.

It will be understood that the privileged position of the invention is defined as being the prepositioning position of the spacer on the bodywork part.

In the invention, the term "thin wall" is used to mean a portion of the piece which has one dimension that is very small compared with its other two dimensions.

Preferably, the area of the spacer that bears against the support is large enough to prevent any creep of the spacer, including when its temperature is high.

This area is selected as a function of the conditions desired and as a function of the material used.

In the event of the spacer being secured to the support by means of a screw, an appropriate choice of bearing area makes it possible, in particular, to avoid using a lock washer as is commonly used for keeping a screw tight.

In a particular embodiment, the spacer has tabs for holding the thin wall within the thickness of the spacer, and one of the longitudinal edges of the opening has one or more notches shaped to correspond to the shape of the tab(s) of the spacer, thereby enabling the spacer to be put into place in the opening.

In this embodiment, the position in which the spacer is put into place in the opening is remote from its privileged position.

Preferably, provision is made for the tabs to be asymmetrical on opposite sides of the spacer so that the notches in the opening allow the spacer to be inserted in a single orientation only in which the elastically deformable portion of the spacer and the coupling shape of the thin wall are on the same side.

In a preferred embodiment of the invention, the elastically deformable portion of the spacer is constituted by a resilient tongue provided with an outwardly directed projection which bears against one of the longitudinal edges of the opening, the longitudinal edge in question having, as its coupling shape, an indentation in which the projection of the resilient tongue engages when the spacer is occupying its privileged position relative to the opening.

According to the invention, the privileged position of the spacer relative to the opening is such that the spacer can move inside the opening in a first direction to compensate for post-shrinkage of the thermoplastic material, and in a second direction, opposite to the first, to compensate for differential expansion between the part made of thermoplastic material and the support.

Since expansion differences are preponderant, the stroke available to the spacer in the opening in the second direction is preferably greater than that available to it in the first direction.

In a preferred embodiment of the invention, the elastically deformable portion of the spacer, e.g. the resilient tongue provided with a projection, is integrally molded with the spacer.

In a particular embodiment of the invention, the spacer has a head covering it completely, the head being wider than the opening so as to be incapable of passing through it, in order to maintain the thin wall in the thickness of the spacer.

BRIEF DESCRIPTION OF THE DRAWINGS

In order to make the invention better understood, an embodiment is described below by way of non-limiting example with reference to the accompanying drawings, in which:

FIG. 1 is a perspective view of a portion of a bodywork part for mounting, and a mount constituting an embodiment of the invention;

FIG. 2 is a view of the mount from beneath;

FIG. 3 is a view of the mount from above;

FIG. 4 is a detail view of portion IV of FIG. 2;

FIG. 5 is a section view on V—V of FIG. 3;

FIG. 6 is a section view on VI—VI of FIG. 3;

FIG. 7 is a section view on VII—VII of FIG. 3; and

FIG. 8 is a view analogous to FIG. 5, showing the support.

MORE DETAILED DESCRIPTION

In FIG. 1, there can be seen a portion of a bodywork part 1 of plastics material which comprises a thin wall for mounting in sliding manner to a support (not shown).

An elongate opening 2 of rectangular shape is made through the thin wall. The opening is defined by two substantially parallel longitudinal edges 3 and 4.

An indentation 5 is made in the thickness of one of the longitudinal edges 4, and two notches 6 are formed in the other longitudinal edge 3.

A mount 7 for installing in the opening comprises a spacer-forming portion 8 whose thickness is greater than the thickness of the thin wall, and which is suitable for sliding inside the opening 2 in its longitudinal direction, and a head 9 which projects from the spacer 8 all around it and which is wider than the opening 2 so as to be incapable of passing through it.

The mount 7 has a central bore 10 perpendicular to its general plane and designed to receive anchor means (not shown) such as a screw for securing the mount to the support (not shown).

The diameter of the bore 10 is deliberately chosen to be greater than that of the mount screw (not shown) so as to leave radial clearance which enables the position of the sliding mount on the support to be adjusted, in particular in the horizontal direction perpendicular to the axis of the vehicle.

The head 9 of the mount is constituted by a plate 11 surmounted by conventional stiffening ribs 12, and it is not described in detail herein.

The spacer 8 is generally in the form of a slab of width that is very slightly smaller than that of the opening 2 in the thin wall.

Two pairs of tabs 13 and 14 project from respective side faces 15 of the slab that extend parallel to the long edges of the opening.

It will be observed that the tabs 13 on the same side as the notches are smaller than the tabs 14 that are on the same side as the indentation 5.

This difference is to guarantee that the mount is the rightway round when it is put into place in the opening.

A resilient tongue 16 extending parallel to the longitudinal edges 3 and 4 is also provided between the two large tabs 14.

The resilient tongue 16 is integrally molded with the rest of the mount, and a chimney 17 is formed over the resilient tongue inside the head 9 so as to enable the mount to be unmolded.

As can be seen in greater detail in FIG. 4, the shape of the resilient tongue 16 which has one end 19 secured to the spacer and has an opposite end provided with a projection 18 extending from the side face 15, is of a shape enabling the projection 18 to move transversely, as represented by arrow 20.

On the bottom face of the slab forming the spacer 8, there is provided a countersink 24 leaving, on either side thereof, only two shoes 25 for bearing against the support.

The role of this countersink is explained below with reference to FIG. 8.

The mount is put into place on the thin wall as shown in FIG. 1, i.e. by presenting the resilient tongue 16 so that it faces the edge 4 of the opening that has the indentation 5 and by engaging said edge between the head 9 of the mount piece and the large tabs 14 of the spacer, and then pivoting the mount piece about the edge 4, as represented by arrows 21 in FIG. 1, so as to bring the small tabs 13 into the notches 6 formed in the opposite edge 3.

The small tabs 13 thus pass behind the thin wall, and the mount can then be slid along the opening until the projection 18 on the resilient tongue 16, bearing against the longitudinal edge 4 that has the indentation 5, holds the mount in place by engaging in the indentation 5.

It will be understood that the resilient tongue 16 thus provides prepositioning of the mount 7 relative to the bodywork part 1, but that the snapping of the projection on the resilient tongue into the indentation can easily be overcome to allow the mount to act as a sliding mount in the event of post-shrinkage of the bodywork part, or in the event of difference to expansion between said part and other parts of the vehicle, in particular metal parts.

FIG. 8 shows the mount in position on the support 21. In this example, the support has a hole 22 in which a threaded shank 23 is riveted for the purpose of receiving the screw that is passed through the bore 10.

It can be seen that the shank 23 projects from the surface of the support and that its projecting portion is received in the countersink 24 of the mount.

The oblong shape of the countersink 24, as is visible in FIG. 1, enables the position of the mount to be adjusted in the horizontal direction that is perpendicular to the axis of the vehicle.

The depth of the countersink is determined from the height of the projecting portion of the shank, by adding a margin of about one-tenth of a millimeter thereto, which is calculated as a function of the creep of the material which constitutes the shoes of the mount when the screw is tightened so that after tightening the mount bears simultaneously on both shoes 25 and on the shank 23.

Naturally, the embodiment described above is not limiting in any way and any desirable modifications can be made thereto without thereby going beyond the ambit of the invention.

In particular, it is clear that the countersink 24 could be omitted if a projecting shank was not used on the support for retaining the mount screw, and that that would give a larger area where the mount bears directly on the support.

What is claimed is:

1. An assembly of a sliding mount, a motor vehicle bodywork part made of plastics material and a support, the part being, in the absence of the sliding aspect of the sliding mount, subject to substantial stress or deformation due to differential expansion between the part and the support or due to post-shrinkage of the part, the part having at least one thin wall and being mounted in sliding manner on the support via the thin wall and the mount, the thin wall having an elongate opening therein with two longitudinal edges substantially parallel at least over a portion of their lengths, the sliding mount comprising a spacer separate from the part, thicker than the thin wall, and suitable for sliding in the opening between the two longitudinal edges thereof, wherein the spacer comprises an elastically deformable portion bearing slidably against the thin wall of the part when the spacer slides in the opening, the thin wall having a coupling shape configured such that when the spacer is in a predetermined position relative to the opening, the deformable portion of the spacer couples with the thin wall.

2. An assembly according to claim 1, wherein the spacer has tabs for holding the thin wall between the tab(s) and the support, and one of the longitudinal edges of the opening has one or more notches shaped to correspond to the shape of the tab(s) of the spacer, thereby enabling the spacer to be put into place in the opening.

3. An assembly according to claim 2, wherein the position in which the spacer is put into place in the opening is remote from the predetermined position.

4. An assembly according to claim 2, wherein the tabs are asymmetrical on opposite sides of the spacer so that the notches in the opening allow the spacer to be inserted in a single orientation only in which the elastically deformable portion of the spacer and the coupling shape of the thin wall are on the same side.

5. An assmebly according to claim 1, wherein the elastically deformable portion of the spacer is constituted by a resilient tongue provided with an outwardly directed projection which bears against one of the longitudinal edges of the opening, the one longitudinal edge having, as its coupling shape, an indentation in which the projection of the resilient tongue engages when the spacer is occupying the predetermined position relative to the opening.

6. An assembly according to claim 1, wherein the predetermined position of the spacer relative to the opening is such that the spacer can move inside the opening in a first direction to compensate for post-shrinkage of a thermoplastic material, and in a second direction, opposite of the first, to compensate for differential expansion between the part made of said thermoplastic material and the support.

7. An assembly according to claim 1, wherein the elastically deformable portion of the spacer is integrally molded with the spacer.

8. An assembly mount according to claim 1, wherein the spacer has a head covering it completely, the head being wider than the opening so as to be incapable of passing through it, in order to maintain the thin wall in the thickness of the spacer.

9. An assembly according to claim 1, wherein the area of the spacer bearing against the support is large enough to prevent any creep of the spacer, including when the temperature thereof is high.

10. A sliding mount, a motor vehicle bodywork part made of plastics material and a support, said part having at least one thin wall mounted in sliding manner on said support via the thin wall and the mount, the thin wall having an elongate opening therein with two longitudinal edges substantially parallel at least over a portion of their lengths, the sliding mount comprising a spacer separate from the part, thicker than the thin wall, and suitable for sliding in the opening between the two longitudinal edges thereof, wherein the spacer comprises an elastically deformable portion bearing slidably against the thin wall of the part when the spacer slides in the opening, the spacer having tabs for holding the thin wall between the tabs and the support, and one of the longitudinal edges of the opening having one or more notches shaped to correspond to the shape of the tab(s) of the spacer, thereby enabling the spacer to be put into place in the opening, the tabs being asymmetrical on opposite sides of the spacer so that the notches in the opening allow the spacer to be inserted in a single orientation only in which the elastically deformable portion of the spacer and a coupling shape of the thin wall are on the same side, the thin wall having the coupling shape configured such that when the spacer is in a predetermined position relative to the opening, the deformable portion of the spacer couples with the thin wall.

* * * * *